INVENTORS.
ROGER D. ERICKSON
LARRY J. GIRARD
SAMUEL F. DRURY
BY
ATTORNEY.

July 6, 1965 R. D. ERICKSON ETAL 3,192,921
BODY FUNCTION MEASURING APPARATUS
Filed July 10, 1961 5 Sheets-Sheet 4

*INVENTORS.*
ROGER D. ERICKSON
LARRY J. GIRARD
SAMUEL F. DRURY
BY
ATTORNEY.

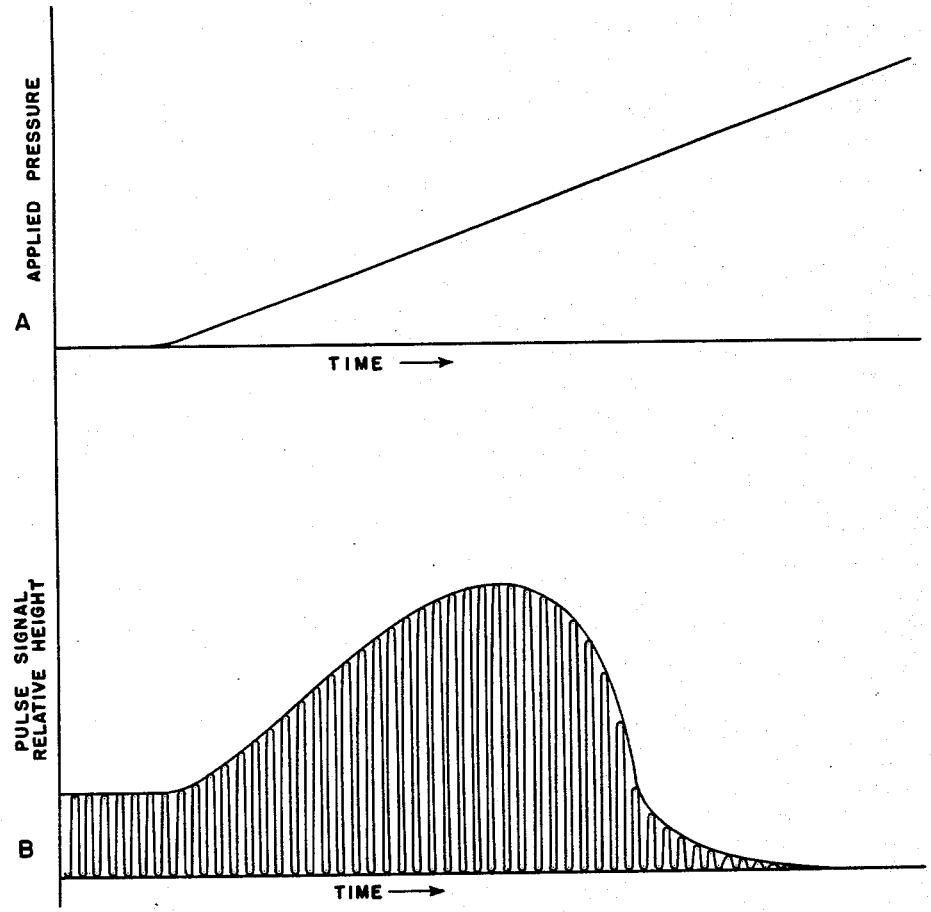

United States Patent Office 3,192,921
Patented July 6, 1965

3,192,921
BODY FUNCTION MEASURING APPARATUS
Roger D. Erickson and Larry J. Girard, Littleton, and Samuel F. Drury, Denver, Colo., assignors to Honeywell Inc., a corporation of Delaware
Filed July 10, 1961, Ser. No. 122,885
8 Claims. (Cl. 128—2.05)

This invention relates to condition monitoring apparatus, and more particularly to a means and method of sensing and recording body functions.

There are numerous circumstances now prevalent wherein it has been found desirable to monitor certain functions of the human body. Among these, pulse rate and blood pressure, both systolic and diastolic, are functions found to be important as being indicative of the condition of the one under observation. Heretofore, such observations have been made either manually or through rather cumbersome apparatus, employing methods that left much to be desired.

It is, accordingly, an object of the present invention to provide an improved means for monitoring such body functions as pulse rate and blood pressure.

It is another object of this invention to provide improved means for determining and deriving indications of pulse rate, systolic and diastolic blood pressure.

It is a further object of the present invention to provide an improved method of measuring pulse rate, systolic and diastolic blood pressure.

In accomplishing these, and other objects, there has been provided, in accordance with the present invention, a photoelectric pulse sensing detector which may be coupled onto the ear of the person under observation. The detector is provided with means for progressively, under controlled pressure conditions, occluding the blood vessels in the ear. The resulting pulses detected by the detector are amplified and fed to pulse responsive means to produce a series of pulse signals until the amplitude detected pulses fall below a predetermined level. Further pulse responsive means are provided, responsive to the pulse signals from the first mentioned pulse responsive means to produce a control signal signifying the fall of the amplitude of the detected signals below said predetermined level. In response to this control signal, means provided for the purpose, cause a signal to be recorded which is an analogue of the pressure applied to the ear at the point wherein the detected pulse signal fell below the prescribed value. That analogue signal is calibrated in terms of systolic blood pressure. The amplifier pulse signals from the detector, during static condition periods before occlusion of the blood vessels in the ear begins, are applied to means for producing a signal representative of the amplitude of those pulse signals. This latter signal is subtracted from the systolic analogue signal to produce a signal which is representative of diastolic blood pressure. Further, the pulse signals from the first pulse responsive means are applied, during a predetermined interval, to an accumulator or integrator to produce a signal representative of pulse rate.

A better understanding of the present invention may be had from the following detailed description when read in connection with the accompanying drawings in which:

FIG. 7 is a pair of curves illustrating certain functional relationships of the system.

Figure 1:
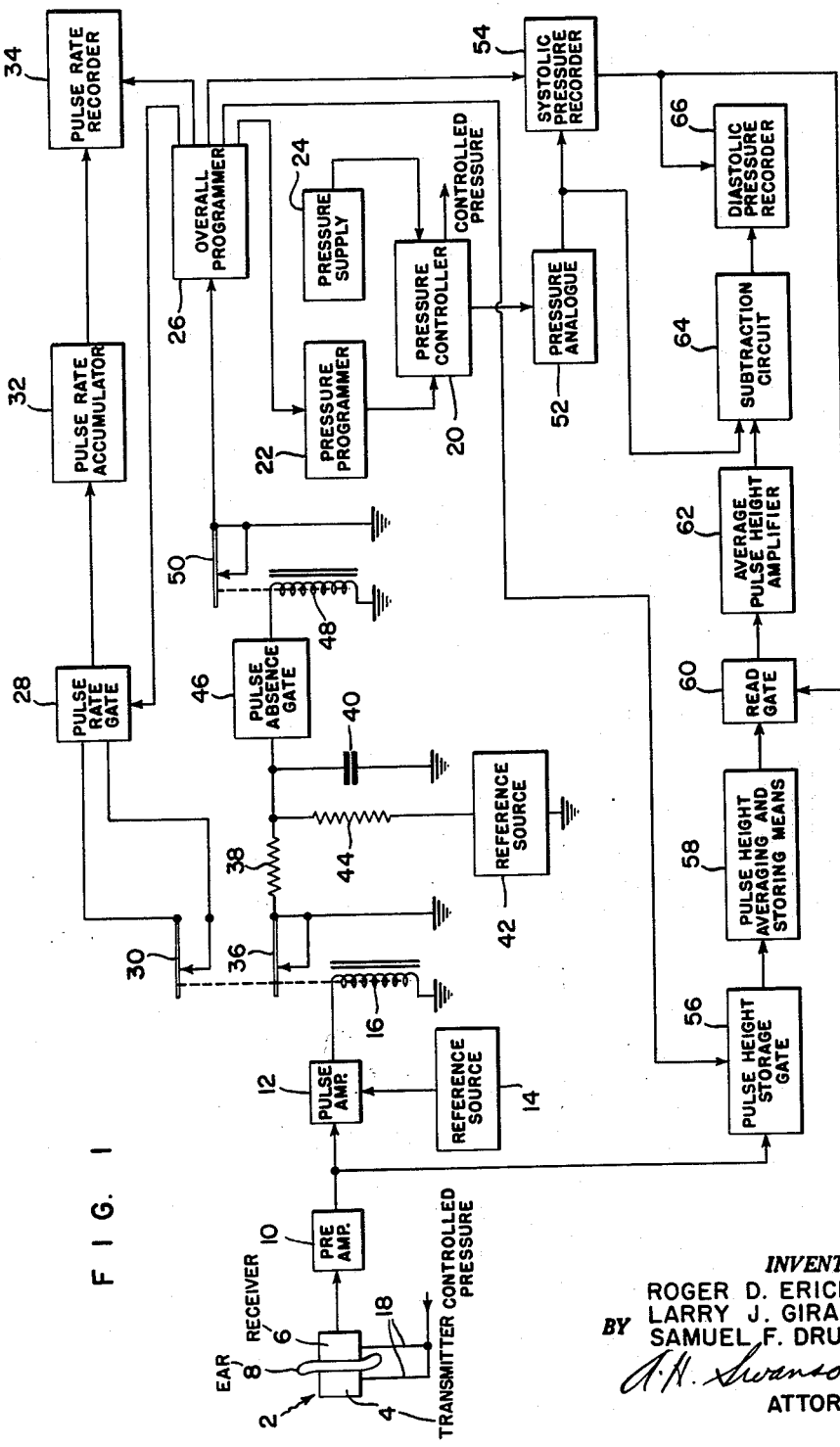
FIG. 1 is a schematic block diagram of a body function monitor according to the present invention.

Referring now to the drawings in more detail, there is shown, in FIG. 1 an illustration of a system embodying the present invention. A sensing device or detector 2, to be described in more detail hereinafter, comprises a transmitting member 4 and a receiving member 6. These members are positioned with the pinna 8 of the ear, of a person under observation, between them in such manner that energy transmitted by the transmitter member 4 passes through the tissue of the ear to the receiving member 6. The blood coursing through the blood vessels of the ear provides a variable impedance to the transmission of energy through the tissue. This produces a series of pulses in the output of the receiver member at a rate which corresponds to the pulse rate of the person under observation. The amplitude of these pulses, initially, is a function of the sensitivity of the detector and the transmission characteristic of the ear tissue. Through suitable circuitry the sensitivity of the detection means may be adjusted to accommodate the individual ear. The pulse signals are fed to preamplifier 10 where the signals are amplified for subsequent use. From the preamplifier 10, the pulse signals are fed to a pulse amplifier 12 where the pulse signals are again amplified, compared with a reference signal from a source 14 and fed to a pulse relay 16. So long as the pulse signals are above a predetermined amplitude, as determined by the reference source 14, the pulse relay 16 will be actuated with each blood pulse or heart beat of the person under observation. The actuation of this pulse relay 16 is then used to control subsequent circuitry. First, however, the operation of the detector must be considered.

The detector 2 includes means, to be described in detail later, for uniformly and progressively increasing the pressure exerted on the tissue of the ear to progressively occlude the blood vessels in that portion of the ear between the members. This means includes the fluid pressure feed lines 18. Controlled fluid pressure is applied through the feed lines 18 from a pressure controller 20. The controller 20 is, in turn, controlled by a pressure programmer 22 to produce a progressively increasing pressure in the feed lines 18 from a pressure supply source 24. The pressure programmer 22, along with the remainder of the system, is under the control of a master, system, or overall programmer 26.

Initially, no added pressure is exerted on the ear by the fluid pressure means of the detector. This results in a time of substantially uniform pulse heights as output signal from the detector 2. This relation may be seen in the representative correlated curves of FIG. 7 where curve A represents a record of the applied pressure from the pressure controller 20 and curve B represents the output signals from the detector 2. At a signal from the master or system programmer 26, the pressure programmer 22 signals the pressure controller 20 to begin to increase the pressure in the leads 18. Sometime prior to this signal to the pressure programmer 22, a control signal is applied from the master programmer 26 to a pulse rate gate 28.

The signal to the pulse rate gate 28 causes the gate to block signals from the pulse relay 16, the pulse relay 16 being provided with a first pair of contacts 30 which operate once each time the pulse relay is actuated. The gate 28 is arranged to pass signals from the pulse relay 16 during the interval of uniform height pulses previously referred to. This interval, determined by the master programmer 26, may, for example, be set at thirty seconds. During this interval, the pulse signals are fed to a pulse rate accumulator 32. The pulse rate accumulator 32 counts the pulses applied during the counting interval and provides an output signal representative of the pulse rate per minute of the person under observation. This output signal is fed to a pulse-rate recorder 34 which, on signal from the master programmer 26, prints out a record of the pulse rate of the person.

As the pressure on the ear of the person under observation is uniformly increased, as indicated by the slope of the curve A of FIG. 7, the amplitude of the pulse signals developed by the detector 2 starts increasing to a maximum, then turns and drops sharply to near zero. An explanation of this characteristic curve is that with no applied pressure on the ear, the pulse heights, during the uniform period, are proportional to the difference between diastolic blood pressure and systolic blood pressure of the ear, that is the cross-sectional dimensions of the blood vessels in the ear assume their normal pattern, producing a normal change in dimension with each blood pulse. As the applied pressure increases, there is produced an increasing difference in the effective dimensions of the blood vessels, hence an increasing difference in the impedance to the transmission of energy through the tissue. That, in turn, produces an increasing pulse height in the developed signal, up to a maximum when the vessels are completely collapsed under diastolic condition. Further increases in applied pressure cause the dimension of the blood vessels to be reduced even under systolic condition. This produces a corresponding reduction in the amplitude of the resultant signal to a theoretical minimum when the blood vessels are collapsed during both diastolic and systolic conditions. Theoretically, the maximum signal should be produced when the applied pressure corresponds to diastolic blood pressure and the point at which the pulse height signals become zero should be representative of that applied pressure which corresponds with systolic blood pressure. In fact, previous systems for automatically measuring blood pressure have been predicated upon this premise. However, experience has taught that these critical points are difficult to determine accurately and produce very poor repeatability. For example, the maximum signal point may be in an envelope which is too flat on top to accurately determine the actual peak. Further, a false peaking of the curve may be produced by the parameters of the measuring circuit. Similarly, the zero point is vague. The slope of the envelope does not follow a straight-line curve to zero but flattens out and gradually approaches zero. The actual zero point becomes obscured in the system low-level noise.

It has been found by the present inventors that one feature of highly accurate repeatability is the sharply breaking downward slope of the envelope between the theoretical diastolic and systolic conditions. It has further been found that a predetermined point on this downward slope bears a uniform fractional relationship to actual arterial systolic blood pressure as determined by the usual arm-cuff method. The present system, then, relies upon this relationship to give an output signal representative of systolic blood pressure.

To this end, the pulse relay 16 is provided with a second set of normally open contacts 36 which are closed once each time the pulse relay 16 is actuated. One arm of the contacts 36 is connected to ground while the other is connected through a resistor 38 to one electrode of a capacitor 40. The other electrode of the capacitor 40 is connected to ground. A reference source 42, constituting a source of charging potential for the capacitor 40, is connected through a resistor 44 to the ungrounded electrode of the capacitor 40. Charging current flows from the reference source to the capacitor 40 tending to produce a charge thereon. However, the charging rate is relatively slow. So long as the contacts 36 of the relay continue to close with each blood pulse, no appreciable charge can be developed on the capacitor 40 since each closure of the contacts 36 short circuits the capacitor 40 to ground, discharging it through the resistor 38. When, however, the detected pulse amplitude falls below that value determined by the reference source 14, the pulse relay 16 ceases to operate. When that happens, the contacts 36 remain open and a charge is permitted to build up on the capacitor 40. The build up of the charge on the capacitor 40 produces a signal which triggers a pulse absence gate 46. This, in turn, causes a pulse absence relay 48 to be actuated, closing a pair of contacts 50 thereon. The closing of the contacts 50 provides a signal to the master programmer 26. Upon receipt of this signal, the master programmer 26 signals the pressure programmer 22 to stop the operation of the pressure controller 20. Connected to and also controlled by the pressure controller 20 is a pressure analogue device 52 which produces an electrical signal which is an analogue function of the controlled pressure output of the pressure controller 20. This analogue signal is calibrated in terms of actual systolic blood-pressure and fed to a systolic blood pressure recorder 54 which, upon a control signal from the master programmer 26, prints a record of the thus determined systolic blood pressure.

Returning to the preamplifier 10, it may be seen that the output thereof is also fed to a pulse height storage gate 56. This gate 56 is normally open to permit the passage of pulses therethrough. However, this gate 56 is controlled by a signal from the overall or master programmer 26. Prior to the time when the pressure controller 20 receives the signal from the pressure programmer 22 to begin the pressure increase, a signal is sent from the programmer 26 to close the gate 56, stopping the further passage of pulses therethrough. Thus, the gate 56 passes pulses only during the initial interval of relatively uniform pulse heights. These passed pulses are fed to a pulse height averaging and storage means 58. This means produces a stored signal which corresponds to the average heights of the received pulses during the aforesaid interval. This signal is stored in the means 58 until called for. A read gate 60 is connected to the output of the storage means 58 and blocks the output of the storage means until the gate 60 is opened. When the systolic blood pressure recorder 54 has printed the systolic record, it sends a signal to open the read gate 60 to call for the stored signal in the storage means 58. It will be recalled that it was observed that the pulse height during the relatively uniform pulse height interval is a function of the difference between systolic blood pressure and the diastolic blood pressure. In view of this, the average pulse height signal, when passed by the gate 60 is fed to an amplifier 62 to produce an analogue signal which is a suitable multiple of the stored signal. This analogue signal is then fed to a subtraction circuit 64 to which the analogue signal representative of systolic pressure is also fed. There the pulse height analogue signal is subtracted from the systolic pressure analogue signal leaving a remainder which is the analogue of diastolic blood pressure. This signal is fed to a diastolic blood pressure recorder 66 which, upon receipt of a control signal from the systolic recorder following the printing of the systolic record, prints a record of the diastolic blood pressure.

While three separate recorders have been indicated, one for each of the three recited functions, it should be apparent that a single, multiple-record instrument may be used.

In order to provide a reliable signal to the foregoing system, an improved detector structure has been provided. This structure is shown in detail in FIGS. 3–6 to which reference is now made. The detector 2, as noted, includes a transmitter member 4 and a receiver member 6. The transmitter member includes a transmitter housing member 68 which is in the form of a generally cylindrical body having a central bore therethrough. Within the bore of the body member 68 is positioned an energy transmitting device 70. In these drawings the device 70 is illustrated as being a small light bulb. This bulb is cemented into the bore by a suitable cement. The bore is also provided with one or more axial grooves 72, providing a passageway around the bulb through which a suitable fluid such as air may be passed. A rear cap 74 is provided which closes the bore at one end with the exception of an inlet passage. The cap 74 is sealed to the main housing member 68 to provide a substantially unitary structure. The inlet passage accommodates an input line which includes an air line 18 having a pair of electric leads 76 for carrying energizing current to the bulb 70. Over the open end of the housing member 68 there is secured a thin, flexible transparent diaphragm member 78. This diaphragm provides a flexible but fluid tight seal over the open end of the transmitter housing member 68.

The receiver member 6 is quite similarly constructed in that there is provided a similarly shaped main housing member 80 having a central bore. In the bore is secured an energy responsive device such as a photocell 82. Here, too, one or more side grooves 84 are provided in the bore to provide a passageway for the air, or other fluid, around the photocell 82. A transparent protective disk 86 covers the face of the photocell 82 and extends outwardly over the open end of the housing member 80. Accordingly, one or more radial grooves 88 are provided in the face of the housing member 80 to continue the air passage provided by the grooves 84. Again, a thin, flexible, transparent diaphragm 85 covers the open end of the housing member 80. This diaphragm, too, provides a flexible, fluid tight seal over the front end of the housing member 80.

The rear end of the housing member is sealed into a mounting arm 90 which closes and seals the rear end of the housing member 80. As in the case of the rear cap 74, an inlet passage is provided in the arm member 90. This, similarly, accommodates an air line 18 which also carries within it a pair of electrical leads 92. These leads carry the electrical signal developed at or across the photocell 82 to the rest of the system as shown in FIG. 1.

A support structure comprises a hinge means for uniting the transmitter member 4 and the receiver member 6 into a unitary structure. The support structure includes a cylindrical housing or outer member 94. A lock ring 96 fits into an internal circumferential groove in the housing member 94 to provide an end stop for a multipart inner structure. The inner structure comprises a plurality, here shown as four, central wedge members 98 and a pair of conjugate end wedge members 100. These members are arranged within the outer member 94 with the butt end of one of the end wedge members 100 in engagement with the lock ring abutment 96 with its wedge surfaces pointing toward the opposite end of the housing member. Next the four central wedges 98, which are tapered at both ends at an angle which is conjugate or mating with the taper of the end wedges, are positioned within the housing or outer member 94. Then the other end wedge member 100 is positioned with its wedge surfaces mating with the corresponding surfaces of the central wedge members 98. A second locking ring abutment 102 is provided to keep these several parts within the housing member 94. However, the second ring 102, is so positioned that the several parts fit loosely within the housing. It may be seen from the drawing that the several wedges are so contoured to substantially match the inner surface of the housing member 94 but a transverse space is left between the wedges. Into this space there is inserted a tongue end of a second arm member 104 which extends through an oversized axial slot in the outer or housing member 94. The tongue end of this arm is secured to the inner structure by a pin key 106 which lies in a transverse groove in the tongue end of the arm 104 and a matching groove in an appropriate one of the central wedges. The outer end of the arm 104 carries the transmitter member 4. The arm 90, which carries at one end the receiver member 6, is secured to the outer surface of the outer member 94 as by a suitable cement such as epoxy. Thus the several elements constitute a unitary structure.

With the inner structure of the support means relatively loosely contained within the outer or housing member 94 the two arms are relatively movable in an arcuate direction with respect to each other with the support member serving as a hinge. The amount of freedom of movement is small, being limited by the arcuate dimensions of the slot in the housing member 94. A leaf spring 108 is secured to the bottom of the first arm 90 and is contoured to engage the back of the transmitter member 4. This spring normally urges the transmitter member 4 and the receiver member 6 toward each other to a minimum separation between them to permit the structure to be mounted on the ear of the person under observation and provide a measure of uniformity in the initially applied mechanical pressure on the ear.

Once in place on the ear, means must be provided for locking the two members 4 and 6 in their relative position to prevent further separation when fluid pressure is added to inflate the diaphragms 78 and 85. Preferably, this locking means should be such as to be operable to effect the locking function without imparting a tendency to modify the initial pressure on the ear applied by the spring 108. To this end, a knurled cap 110 is threaded onto the one end of the housing member 94. This cap has a central boss or protuberance 112 which extends into the interior of the housing 94 in a position to engage the butt end of one of the end wedge members 100. When the cap is screwed down, the end wedges 100 are axially urged toward each other, forcing the central wedges radially apart until they tightly engage the inner surface of the housing member as well as tightly engaging the tongue of the arm 104. This prevents relative movement between the inner and outer structures, and, hence, between the transmitter member and the receiver member, and it has been accomplished without any relative arcuate force applied to the two transducing members.

It has been mentioned that a thin flexible transparent diaphragm has been placed on each of the transducing members of the structure. When the structure is locked in position on the ear, the uniform increase in fluid pressure, which may be air, referred to in connection with the pressure controller, is admitted through the pipes 18 to both members and uniformly inflates the two diaphragms 78 and 85 to accomplish the desired occlusion. Heretofore, somewhat similar devices have been shown which include an inflatable diaphragm on one of the transducer elements but the other side presents a hard flat surface. Since the surface of the ear is not flat, the use of a hard flat surface as a reference pressure plane produces an uneven occlusion of the blood vessels of the ear, the high points being occluded first then, when the pressure has sufficiently increased, the low points are occluded. With two flexible surfaces as provided here, the flexible diaphragms conform to the contour of the surface of the ear and provided a uniform occlusion, leading to a more accurate output signal. While both diaphragms have been illustrated as being inflatable, it should be apparent that one of the diaphragms might be preinflated and sealed to provide a flexible reference cushion which will still follow the ear contour, leaving only one of the diaphragms to be under the control of the pressure controller.

Figure 2:
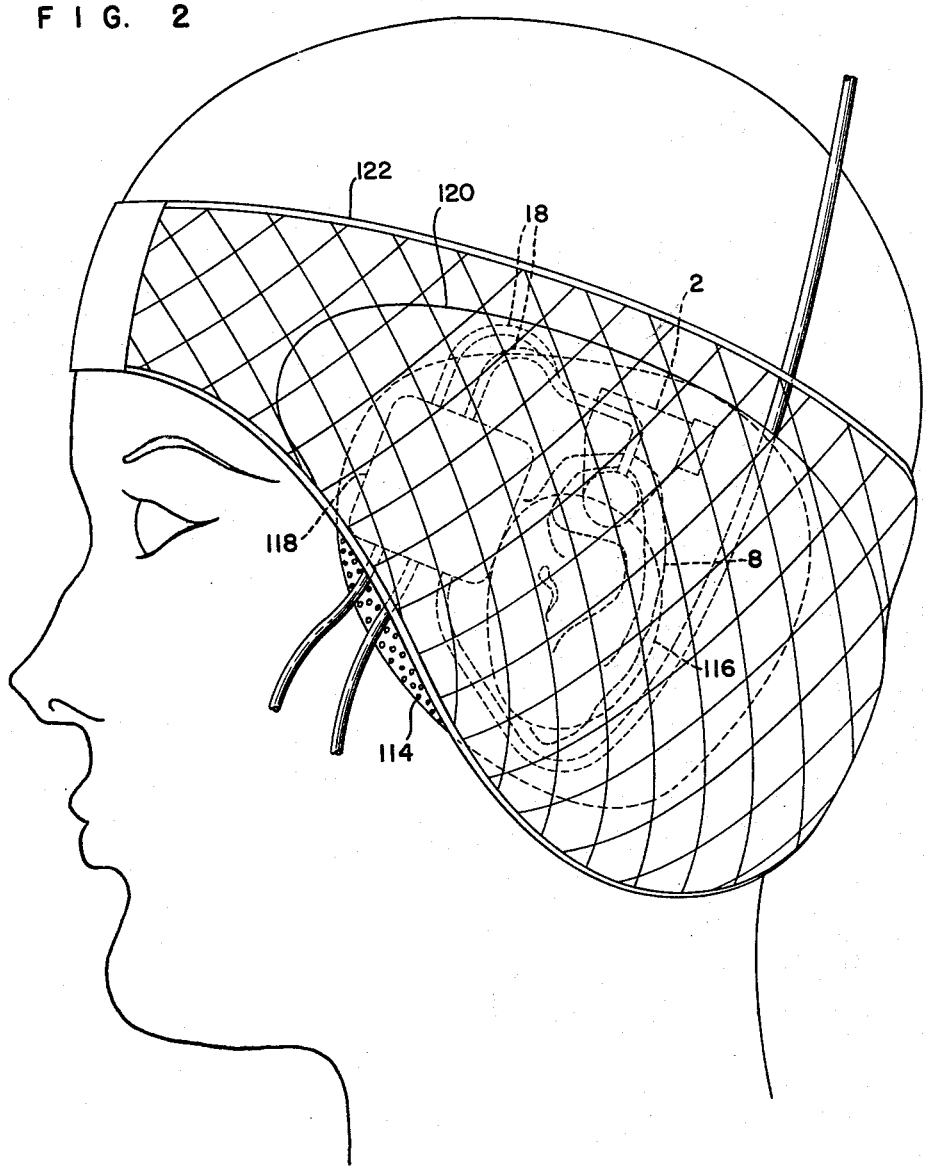
FIG. 2 is a pictorial representation of a person with a body-function detector apparatus in operating position.
Figure 3:
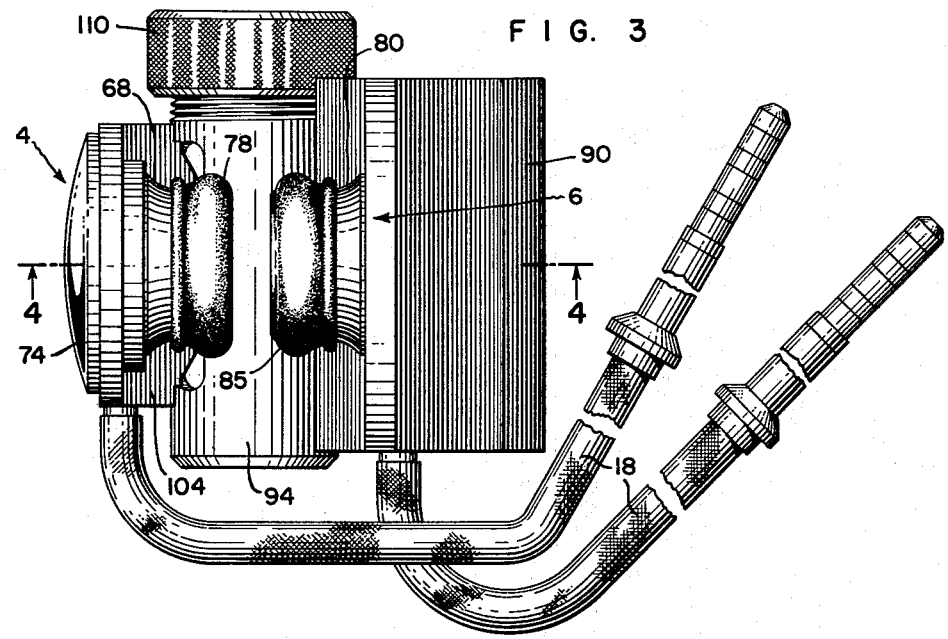
FIG. 3 is a plan view of a body-function detector constructed in accordance with the present invention.
Figure 4:
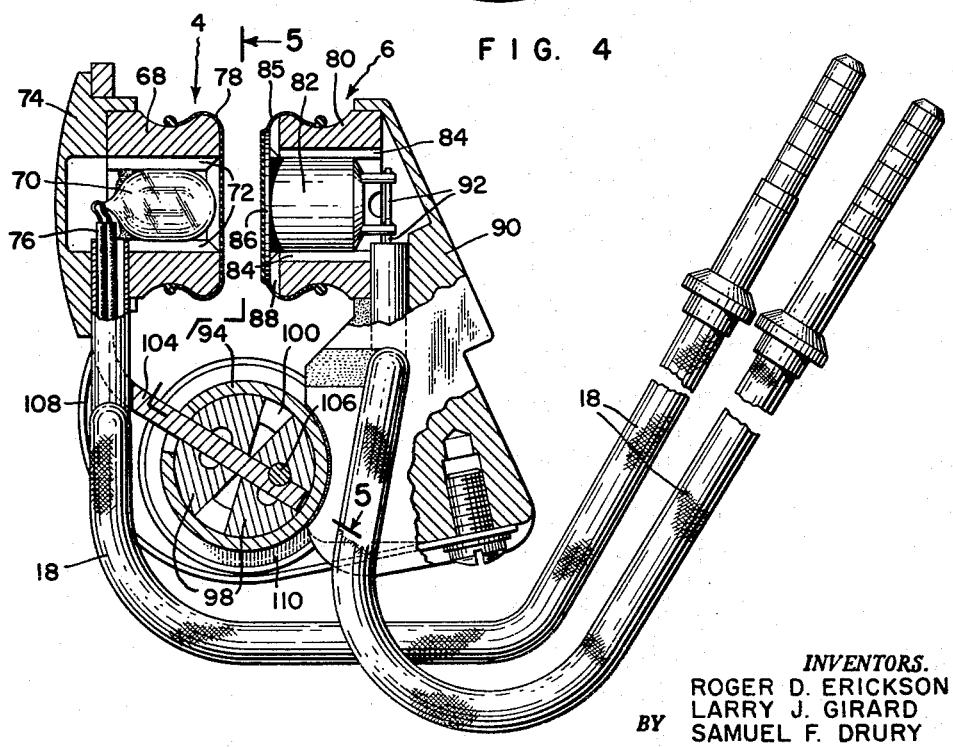
FIG. 4 is a view, partially in section, taken along the line 4—4 of FIG. 3.
Figure 5:
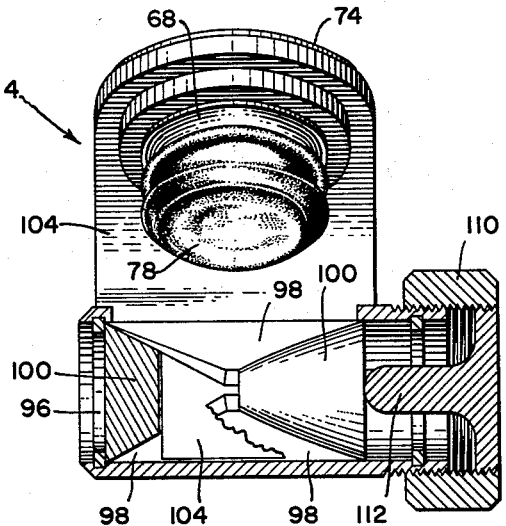
FIG. 5 is a view, partly broken away, taken along the line 5—5 of FIG. 4.
Figure 6:
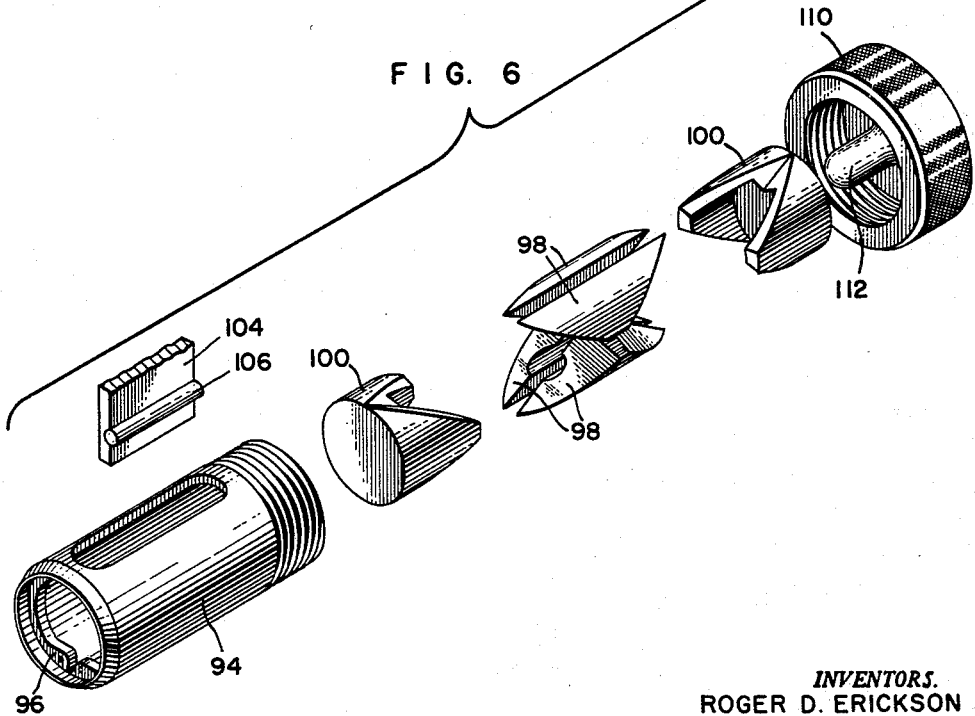
FIG. 6 is an exploded view of the hinge support structure for the detector according to the present invention.

In order to provide a measure of convenience and a minimum of discomfort to the wearer of the detector herein described, a head gear arrangement has been provided. This is illustrated in FIG. 2. A contoured plastice plate 114 is provided with an opening 116 therein through which the ear protrudes. This plate 104 is arranged to be placed next to the head surrounding the ear. This plate carries a terminal box 118 into which the lines 18 of the detector are plugged. With the plate 114 in place the detector structure 2 is attached to the protruding ear. Over this assembly there is positioned a contoured, plastic cup 120 with padded edges. The entire assembly is held in place by a mesh head band 122. With the apparatus thus mounted, the wearer may lie comfortably with the detector in place and may roll over to lie on the ear to which the detector is attached without discomfort or without adversely affecting the operation of the detector.

Thus there has been provided improved means and method for monitoring various body functions.

What is claimed is:

1. A body-function monitor comprising, in combination, means for transmitting energy through a body member, detector means for receiving said energy transmitted through said body member and producing a series of electrical pulse signals corresponding to the dimensional changes in blood vessels in said body member in accordance with the variations in blood pressure due to the pulsing thereof, first means responsive to said electrical pulses to produce a blood pulse rate indication, control means for progressively occluding the blood vessels in said body member to produce a corresponding change in the amplitude in the electrical pulse signals, means responsive to said changes in the amplitude of said pulse signals to produce a control signal when said amplitude drops below a predetermined value, analogue means coupled to said control means for producing an analogue signal corresponding to the condition of said control means, and means responsive to said control signal for indicating the value of said analogue signal at the time of the occurrence of said control signal, said value of said analogue signal corresponding to systolic blood pressure.

2. A body-function monitor comprising, in combination, a transducer structure for attachment to the ear of a person under observation, said transducer including a transmitter member, a receiver member and means for securing said two members a fixed distance apart to impart an initial minimum pressure on said ear, said transducer further including means for transmitting energy from said transmitter member through the tissue of said ear to said receiver member to produce a series of electrical pulse signals corresponding to the pulsing of the blood vessels in said tissue, control means for uniformly and progressively increasing the pressure applied to said tissue to progressively occlude the blood vessels therein, said increasing pressure on said tissue causing a characteristic change in the amplitude of the electrical pulse signals, means responsive to said pulse signals to produce a control signal when said pulse signals decrease below a predetermined amplitude, analogue means coupled to said control means to produce an electrical analogue signal corresponding to the condition of said control means, and means responsive to said control signal for indicating the value of said analogue signal at the time the occurrence of said control signal, said value of said analogue signal corresponding to systolic blood pressure.

3. The invention as set forth in claim 2 characterized by the addition of means for producing a second analogue signal proportional to the average amplitude of said pulse signals under conditions of said initial minimum pressure on said ear, and means for subtracting said second analogue signal from said analogue signal corresponding to systolic blood pressure to produce a signal corresponding to diastolic blood pressure.

4. The invention as set forth in claim 3 wherein said means for producing said second analogue signal includes pulse height averaging and storing means, and gate means controlled by said control means to limit said pulses admitted to said averaging and storing means to periods corresponding to said initial minimum pressure.

5. The invention as set forth in claim 2 wherein said means responsive to said pulse signals to produce a control signal when said pulse signals decrease below a predetermined amplitude includes a pulse signal amplifier to produce amplified pulse signals, reference means for biasing said amplifier to cutoff when said pulse signals decrease to said predetermined level, a first relay responsive to said amplified pulse signals to be actuated by each amplified pulse signal, gate means, means responsive to the actuation of said first relay for blocking said gate means, second relay means operative in response to opening said gate means upon interruption of the operation of said first relay, the operation of said second relay being effective to initiate said control signal.

6. A method of monitoring blood pressure of a person under observation, said method comprising deriving a series of pulse signals corresponding to the pulsing of the blood vessels in the ear of said person, after an initial period of minimum applied pressure to said ear applying a progressively increasing controlled pressure to said ear to progressively and uniformly occlude the blood vessels in said ear to produce a characteristic change in the amplitude of said pulse signals, deriving an analogue signal corresponding to the controlled pressure applied to said ear, and indicating the value of said analogue signal at a value thereof corresponding to a predetermined rapid decrease in said amplitude of said pulse signals, said value of said analogue signal corresponding to the systolic blood pressure of said person.

7. The invention as set forth in claim 6 characterized in the further steps of deriving a second analogue signal proportional to the average amplitude of said pulse signals during said initial period, and subtracting said second analogue signal from the first mentioned analogue signal to produce a signal corresponding to the diastolic blood pressure of said person.

8. A body-function monitor comprising, in combination detector means for deriving a series of electrical pulse signals corresponding to the pulsing of the blood vessels in a body member of a person under observation, control means for progressively and uniformly increasing the pressure on said body member to progressively occlude the blood vessels therein to produce a characteristic change in the amplitude of said electrical pulse signals, means responsive to a predetermined decrease in said pulse signals to produce a control signal, analogue means coupled to said control means to produce an analogue signal corresponding to the condition of said control means, and means responsive to said control signal for indicating the value of said analogue signal at the time of the occurrence of said control signal, said value corresponding to systolic blood pressure of said person.

References Cited by the Examiner

UNITED STATES PATENTS

| | | | |
|---|---|---|---|
| 2,352,875 | 7/44 | Williams | 128—2.05 |
| 2,540,163 | 2/51 | Brosene | 128—2.05 |
| 2,827,040 | 3/58 | Gilford | 128—2.05 |
| 2,865,365 | 12/58 | Newland | 128—2.05 |
| 3,051,165 | 8/62 | Kompelien | 128—2.05 |

RICHARD A. GAUDET, *Primary Examiner.*

RICHARD J. HOFFMAN, LOUIS R. PRINCE,
*Examiners.*